(12) United States Patent  
Ravishankar et al.

(10) Patent No.: US 11,868,716 B2  
(45) Date of Patent: Jan. 9, 2024

(54) KNOWLEDGE BASE QUESTION ANSWERING

(71) Applicant: International Business Machines Corporation, Armonk, NY (US)

(72) Inventors: Srinivas Ravishankar, White Plains, NY (US); Pavan Kapanipathi Bangalore, White Plains, NY (US); Ibrahim Abdelaziz, Tarrytown, NY (US); Nandana Mihindukulasooriya, Cambridge, MA (US); Dinesh Garg, Beawar (IN); Salim Roukos, Redondo Beach, CA (US); Alexander Gray, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 17/462,327

(22) Filed: Aug. 31, 2021

(65) Prior Publication Data

US 2023/0060589 A1  Mar. 2, 2023

(51) Int. Cl.
*G06F 40/20* (2020.01)
*G06F 16/2452* (2019.01)
*G06N 3/08* (2023.01)
*G06F 16/901* (2019.01)
*G06N 3/042* (2023.01)

(52) U.S. Cl.
CPC ........ *G06F 40/20* (2020.01); *G06F 16/24522* (2019.01); *G06F 16/9024* (2019.01); *G06N 3/042* (2023.01); *G06N 3/08* (2013.01)

(58) Field of Classification Search
USPC ...................................... 704/1–504
See application file for complete search history.

(56) References Cited

U.S. PATENT DOCUMENTS

| | | | |
|---|---|---|---|
| 10,592,610 B1* | 3/2020 | Shen | G06F 40/30 |
| 10,606,846 B2 | 3/2020 | Li | |
| 11,501,085 B2* | 11/2022 | Galitsky | G06F 40/284 |
| 11,526,333 B2* | 12/2022 | Hunter | G06F 9/5038 |

(Continued)

FOREIGN PATENT DOCUMENTS

| | | |
|---|---|---|
| CN | 106934012 B | 7/2017 |
| CN | 108052547 B | 5/2018 |

(Continued)

OTHER PUBLICATIONS

Kapanipathi et al., "Leveraging Abstract Meaning Representation for Knowledge Base Question Answering", Grace Period Disclosure, arXiv:2012.01707v2 [cs.CL] Jun. 2, 2021, 11 pages.

(Continued)

*Primary Examiner* — Marcus T Riley  
(74) *Attorney, Agent, or Firm* — Randy Tejeda

(57) ABSTRACT

One or more computer processors parse a received natural language question into an abstract meaning representation (AMR) graph. The one or more computer processors enrich the AMR graph into an extended AMR graph. The one or more computer processors transform the extended AMR graph into a query graph utilizing a path-based approach, wherein the query graph is a directed edge-labeled graph. The one or more computer processors generate one or more answers to the natural language question through one or more queries created utilizing the query graph.

20 Claims, 9 Drawing Sheets

(56) References Cited

U.S. PATENT DOCUMENTS

| | | | |
|---|---|---|---|
| 11,694,815 B2* | 7/2023 | Bettencourt-Silva | G06N 20/00 707/748 |
| 11,711,469 B2* | 7/2023 | Brink | H04M 3/5166 379/88.01 |
| 11,741,316 B2* | 8/2023 | Galitsky | G06F 40/44 704/9 |
| 2011/0078166 A1 | 3/2011 | Oliver | |
| 2019/0146985 A1 | 5/2019 | Zou | |
| 2020/0151219 A1* | 5/2020 | Anand | G06F 16/24522 |
| 2021/0191938 A1* | 6/2021 | Galitsky | G06N 5/01 |
| 2021/0365817 A1* | 11/2021 | Riegel | G06N 5/046 |
| 2023/0060589 A1* | 3/2023 | Ravishankar | G06F 16/3332 |

FOREIGN PATENT DOCUMENTS

| | | |
|---|---|---|
| CN | 110297893 A | 10/2019 |
| CN | 110427471 A | 11/2019 |

OTHER PUBLICATIONS

Kapanipathi et al., "Question Answering over Knowledge Bases by Leveraging Semantic Parsing and Neuro-Symbolic Reasoning", Grace Period Disclosure, arXiv:2012.01707v1 [cs.CL] Dec. 3, 2020, 9 pages.

Diefenbach et al., "WDAqua-core1: A Question Answering service for RDF Knowledge Bases", © 2018, 5 pages, <https://doi.org/10.1145/3184558.3191541>.

Sorokin et al., "Modeling Semantics with Gated Graph Neural Networks for Knowledge Base Question Answering", arXiv:1808.04126v1 [cs.CL] Aug. 13, 2018, 12 pages.

Zou et al., "Natural Language Question Answering over RDF—A Graph Data Driven Approach", SIGMOD'14, Jun. 22-27, 2014, Snowbird, UT, USA, 13 pages, <https://dl.acm.org/doi/10.1145/2588555.2610525>.

* cited by examiner

500

---

Algorithm 1: AMR to triples

1 Input : Question text $t$, AMR graph $G : (V_g, E_g)$
having a set of nodes $V_e \in V_g$, each linked to a named entity in the KG 2 Returns : Query graph $Q : (V_Q, E_Q)$
Initialize $Q : (V_Q, E_Q)$, $V_Q := \{\}$, $E_Q := \{\}$ 3 if $t$ *is imperative* then
4      let source node (imperative predicate) be $r$
5      set $q$ as *amr-unknown* where $edge(r, q, 'arg1') \in G_E$
6      delete $r$ and its edges from $G$
7 $a :=$ *amr-unknown* node
8 if $\exists\, b : edge(a, b, 'mod') \in E_g$ then
9      $a := b$ 10 for $e$ *in* $V_e$ do
11      $amrPath :=$ getShortestPath$(G, a, e)$
12      let $amrPath$ be $[a, n_1, n_2, ..., n_k]$, where $n_k = e$
13      $collapsedPath := [a]$
14      $n' := a$
15      $relBuilder := '\,'$
16      for $i : 1 \rightarrow k$ do
17          if $n_i \in A_p$ then
18              $relBuilder := relBuilder +$ getRel$_G(n', n_i)$
19          else if $n_i \in A_c$ then
20              append $n_i$ to $collapsedPath$
21              add node $n'$ to $V_Q$
22              add $edge(n', n_i, relBuilder)$ to $E_Q$
23              $n' := n_i$,
24              $relBuilder := '\,'$
     end
end
25 $Q :=$ *doRelLinking*$(Q)$
26 return $Q$

FIG. 5

|  | Dataset | P | R | F |
|---|---|---|---|---|
| WDAqua | QALD-9 | 26.09 | 26.7 | 24.99 |
| WDAqua | QALD-9 | 29.34 | 32.68 | 29.81 |
| NSQA | QALD-9 | 31.89 | 32.05 | 31.26 |
| WDAqua | LC-QuAD 1.0 | 22.00 | 38.00 | 28.00 |
| QAMP | LC-QuAD 1.0 | 25.00 | 50.00 | 33.00 |
| NSQA | LC-QuAD 1.0 | 44.76 | 45.82 | 44.45 |

FIG. 6

|  | AMR3.0 | QALD-9 | LC-QuAD 1.0 |
|---|---|---|---|
| stack-Transformer | 80.00 | 87.91 | 84.03 |

FIG. 7

| Query Feature | Correct | Total | Correct (%) |
|---|---|---|---|
| SELECT | 164 | 186 | 88.2 |
| ASK | 14 | 9 | 64.3 |
| COUNT | 25 | 31 | 80.6 |
| 1-Hop | 50 | 63 | 79.4 |
| 2-Hop | 96 | 137 | 70.1 |

FIG. 8

| QUESTION TYPE/REASONING | EXAMPLE | SUPPORTED |
|---|---|---|
| SIMPLE | WHO IS THE MAYOR OF PARIS | ✓ |
| MULTI-RELATIONAL | GIVE ME ALL ACTORS STARRING IN MOVIES DIRECTED BY SHATNER. | ✓ |
| COUNT-BASED | HOW MANY THEORIES DID ALBERT EINSTEIN COME UP WITH? | ✓ |
| SUPERLATIVE | WHAT IS THE HIGHEST MOUNTAIN IN ITALY? | ✓ |
| COMPARATIVE | DOES BREAKING HAVE MORE EPISODES THAN THRONES? | |
| GEOGRAPHIC | WAS PORTMAN BORN IN THE UNITED STATES? | ✓ |
| TEMPORAL | WHEN WILL START [sic] THE FINAL MATCH OF THE FOOTBALL WORLD CUP 2018? | |

TABLE 4: QUESTION TYPES SUPPORTED BY NSQA, WITH EXAMPLES FROM QALD

FIG. 10

| | Dataset | P | R | F1 |
|---|---|---|---|---|
| Falcon | QALD-9 | 0.81 | 0.83 | 0.82 |
| NMD+BLINK | QALD-9 | 0.82 | 0.90 | 0.85 |
| Falcon | LC-QuAD 1.0 | 0.56 | 0.69 | 0.62 |
| NMD+BLINK | LC-QuAD 1.0 | 0.87 | 0.86 | 0.86 |

FIG. 11

KNOWLEDGE BASE QUESTION ANSWERING

STATEMENT REGARDING PRIOR DISCLOSURES BY THE INVENTOR OR A JOINT INVENTOR

The following disclosure(s) are submitted under 35 U.S.C. 102(b)(1)(A):

(i) Leveraging Abstract Meaning Representation for Knowledge Base Question Answering; Pavan Kapanipathi, Ibrahim Abdelaziz, Srinivas Ravishankar, Salim Roukos, Alexander Gray, Ramon Astudillo, Maria Chang, Cristina Cornelio, Saswati Dana, Achille Fokoue, Dinesh Garg, Alfio Gliozzo, Sairam Gurajada, Hima Karanam, Naweed Khan, Dinesh Khandelwal, Young-Suk Lee, Yunyao Li, Francois Luus, Ndivhuwo Makondo, Nandana Mihindukulasooriya, Tahira Naseem, Sumit Neelam, Lucian Popa, Revanth Reddy, Ryan Riegel, Gaetano Rossiello, Udit Sharma, G P Shrivatsa Bhargav, and Mo Yu; Dec. 3, 2020.

BACKGROUND

The present invention relates generally to the field of knowledge bases, and more particularly to abstract meaning representation.

Knowledge base question answering (KBQA) is a subfield within Question Answering with desirable characteristics for real-world applications. KBQA requires a system to answer a natural language question based on facts available in a Knowledge Base (KB). A KB is a technology used to store structured information used by a computer system. Facts are retrieved from a KB through structured queries (in a query language such as SPARQL), which often contain multiple triples that represent the steps or antecedents required for obtaining the answer. This enables a transparent and self-explanatory form of question/answer, meaning that intermediate symbolic representations capture some of the steps from natural language question to answer.

SUMMARY

Embodiments of the present invention disclose a computer-implemented method, a computer program product, and a system. The computer-implemented method includes one or more computer processors parsing a received natural language question into an abstract meaning representation (AMR) graph. The one or more computer processors enrich the AMR graph into an extended AMR graph. The one or more computer processors transform the extended AMR graph into a query graph utilizing a path-based approach, wherein the query graph is a directed edge-labeled graph. The one or more computer processors generate one or more answers to the natural language question through one or more queries created utilizing the query graph.

BRIEF DESCRIPTION OF THE DRAWINGS

FIG. 5 depicts an algorithm, in accordance with an embodiment of the present invention;

FIG. 6 depicts a table, in accordance with an embodiment of the present invention;

FIG. 7 depicts a table, in accordance with an embodiment of the present invention;

FIG. 8 depicts a table, in accordance with an embodiment of the present invention;

FIG. 10 depicts a table, in accordance with an embodiment of the present invention;

FIG. 11 depicts a table, in accordance with an embodiment of the present invention.

DETAILED DESCRIPTION

Knowledge base question answering (KBQA) is an important task in Natural Language Processing (NLP). With the rise of neural networks in NLP, various KBQA models approach the task in an end-to-end manner. Many of these approaches formulate text-to-query-language as sequence-to-sequence problem, and thus require sufficient examples of paired natural language and target representation pairs. However, labeling large amounts of data for KBQA is challenging and computationally intensive, either due to the requirement of expert knowledge or artifacts introduced during automated creation. Real-world scenarios require solving complex multi-hop questions, where multi-hop questions have secondary unknowns within a main question and questions employing unusual expressions. Pipeline approaches can delegate language understanding to pre-trained semantic parsers, which mitigates the data problem, but these approaches suffer from error propagation. The current art and existing approaches face significant challenges that include complex question understanding, necessity for reasoning, and lack of large end-to-end training datasets.

Embodiments of the present invention present Neuro-Symbolic Question Answering (NSQA), a modular KBQA system leveraging Abstract Meaning Representation (AMR) parses for task-independent question understanding. Embodiments of the present invention present an effective graph transformation approach to convert AMR parses into candidate logical queries that are aligned to the KB. This embodiment facilitates the use of reasoners such as Logical Neural Networks (LNN) allowing complex reasoning over knowledge bases. Embodiments of the present invention present a pipeline-based structure that integrates multiple, reusable modules that are trained specifically for individual tasks (semantic parser, entity and relationship linkers, and neuro-symbolic reasoner) and do not require end-to-end training data. Embodiments of the present invention recognize that significant computational resources are conserved through non-end-to-end training data requirements. Embodiments of the present invention delegate the complexity of understanding natural language questions to AMR parsers; reduce the need for end-to-end (text-to-SPARQL) training data with a pipeline architecture where each module is trained for its specific sub-task; and facilitate the use of an independent reasoner via an intermediate logic form. Embodiments of the present invention achieve state-of-the-art performance on two prominent KBQA datasets based on DBpedia (QALD-9 and LC-QuAD 1.0). FIGS. 6-8 and 11 demonstrate the increased effectiveness of the present invention over previous approaches. Implementation of embodiments of the invention may take a variety of forms, and exemplary implementation details are discussed subsequently with reference to the Figures.

The present invention will now be described in detail with reference to the Figures.

Figure 1:
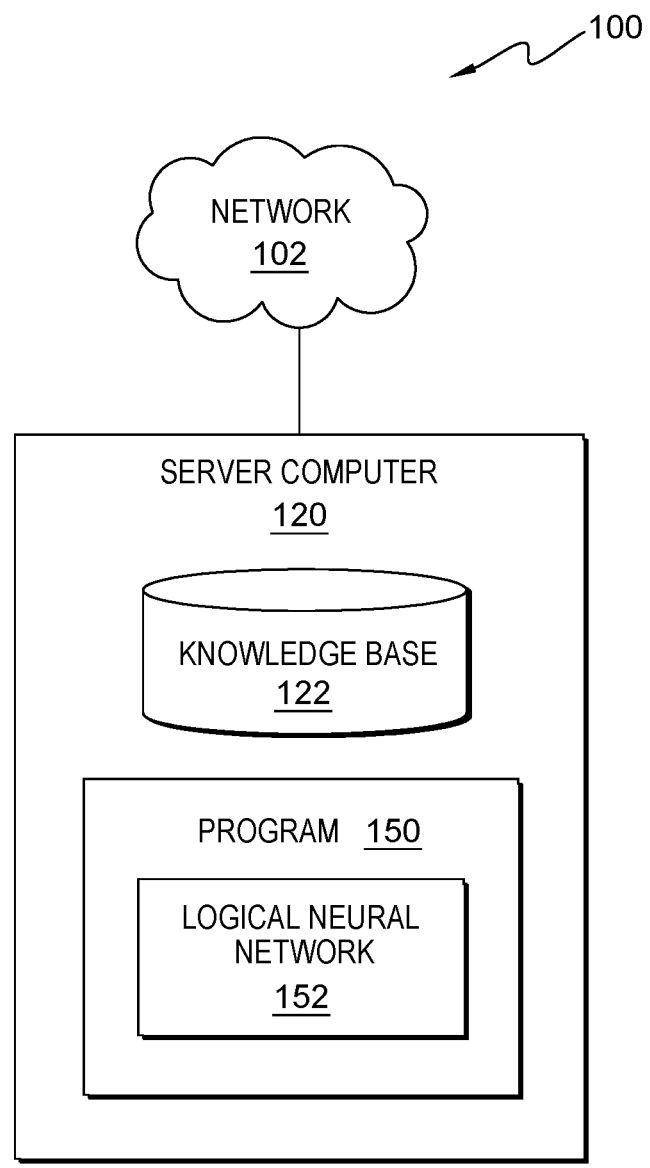
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes knowledge base 122 and program 150. In other embodiments, server computer 120 may contain other applications, databases, programs, etc. which have not been depicted in computational environment 100. Server computer 120 may include internal and external hardware components, as depicted and described in further detail with respect to FIG. 12.

Knowledge base 122 is a repository for data used by program 150. In the depicted embodiment, knowledge base 122 resides on server computer 120. In another embodiment, knowledge base 122 may reside elsewhere within computational environment 100 provided program 150 has access to knowledge base 122. A database is an organized collection of data. Knowledge base 122 can be implemented with any type of storage device capable of storing data and configuration files that can be accessed and utilized by program 150, such as a database server, a hard disk drive, or a flash memory.

Program 150 is a program for Neuro-Symbolic Question Answering (NSQA). In various embodiments, program 150 may implement the following steps: parse a received natural language question into an abstract meaning representation (AMR) graph; enrich the AMR graph into an extended AMR graph; transform the extended AMR graph into a query graph utilizing a path-based approach, wherein the query graph is a directed edge-labeled graph; and generate one or more answers to the natural language question through one or more queries created utilizing the query graph. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. In the depicted embodiment, program 150 includes logical neural network 152. Program 150 is depicted and described in further detail with respect to FIG. 2.

Logical neural network (LNN) 152 is a First Order Logic, neuro-symbolic reasoner. LNN 152 supports two types of reasoning: type-based, and geographic. LNN 152 provides key properties of both neural networks and symbolic reasoning. LNN 152 utilizes weighted real-valued logical reasoning with properties of neural networks. LNN 152 constructs a network for each logical formula. LNN 152 has a 1-to-1 correspondence between an artificial neuron and a logic gate, where the logic operation is performed based on the activation function used.

The present invention may contain various accessible data sources, such as knowledge base 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
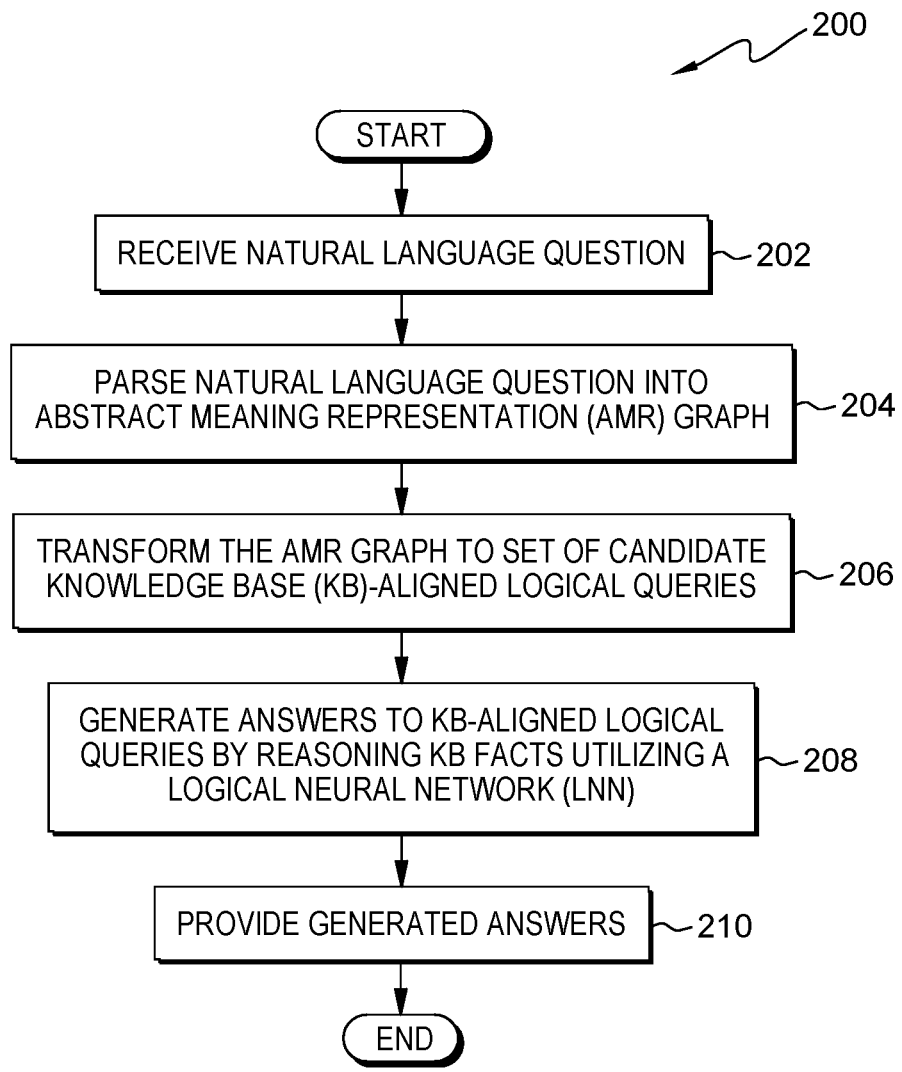
FIG. 2 is a flowchart depicting operational steps of a program, on a server computer within the computational environment of FIG. 1, for Neuro-Symbolic Question Answering (NSQA), in accordance with an embodiment of the present invention.

FIG. 2 depicts flowchart 200 illustrating operational steps of program 150 for Neuro-Symbolic Question Answering (NSQA), in accordance with an embodiment of the present invention.

Program 150 receives a natural language question (step 202). In an embodiment, program 150 initiates responsive to a received or retrieved natural language question. In another embodiment, a user submits, transfers, or transmits a natural language question into program 150. For example, the user types the natural language question into a graphical user interface and the natural language questions is transferred to program 150 for subsequent analysis. In another example, the user speaks the natural language question into an audio receiver (not depicted) associated with program 150 and the natural language question is digitally converted. In another example, the natural language question is "Which actors starred in Spanish movies produced by Fictional Person?".

Program 150 parses the natural language question into abstract meaning representation (AMR) graph (step 204). Program 150 utilizes AMR parsing to reduce the complexity and noise of natural language questions. In an embodiment, program 150 the AMR parse results in a rooted, directed, acyclic graph or AMR graph that is comprised of AMR nodes that represent concepts, which may include normalized surface symbols and PropBank frames as well as other AMR-specific constructs to handle named entities, quantities, dates and other phenomena. In this embodiment, edges in an AMR graph represent the relations between concepts such as standard OntoNotes roles but also AMR specific relations such as polarity or mode. Program 150 produces an AMR Graph G which is a rooted edge-labeled directed acyclic graph $\langle V_G, E_G \rangle$. Here, the edge set $E_G$ consists of non-core roles, quantifiers, and modifiers. The vertex set $V_G \in \text{amr-unknown} \cup A_P \cup A_C$ where $A_P$ are set of PropBank predicates and $A_C$ are rest of the nodes. PropBank predicates are n-ary with multiple edges based on their definitions. amr-unknown is a special concept node in the AMR indicating wh-questions.

Responsive to a produced AMR graph, program 150 enriches the AMR graph with explicit links to entities in the knowledge graph (KG), creating an extended AMR graph. For example, the question in FIG. 3 contains two entities Spain and Fictional Person that need to be identified and linked to KB entries, dbr:Spain and dbr:Fictional_Person. Linking these entities is absolutely necessary for any KBQA. To do so, program 150 trains a Bidirectional Encoder Representations from Transformers (BERT)-based neural mention detection model for disambiguation. Program 150 links the entities to AMR nodes based on the AMR node-text alignment information. The linking is a bijective mapping from $V_e \rightarrow E$ where $V_e$ is the set of AMR entity nodes, and E is the set of entities in the underlying KG.

Figure 3:
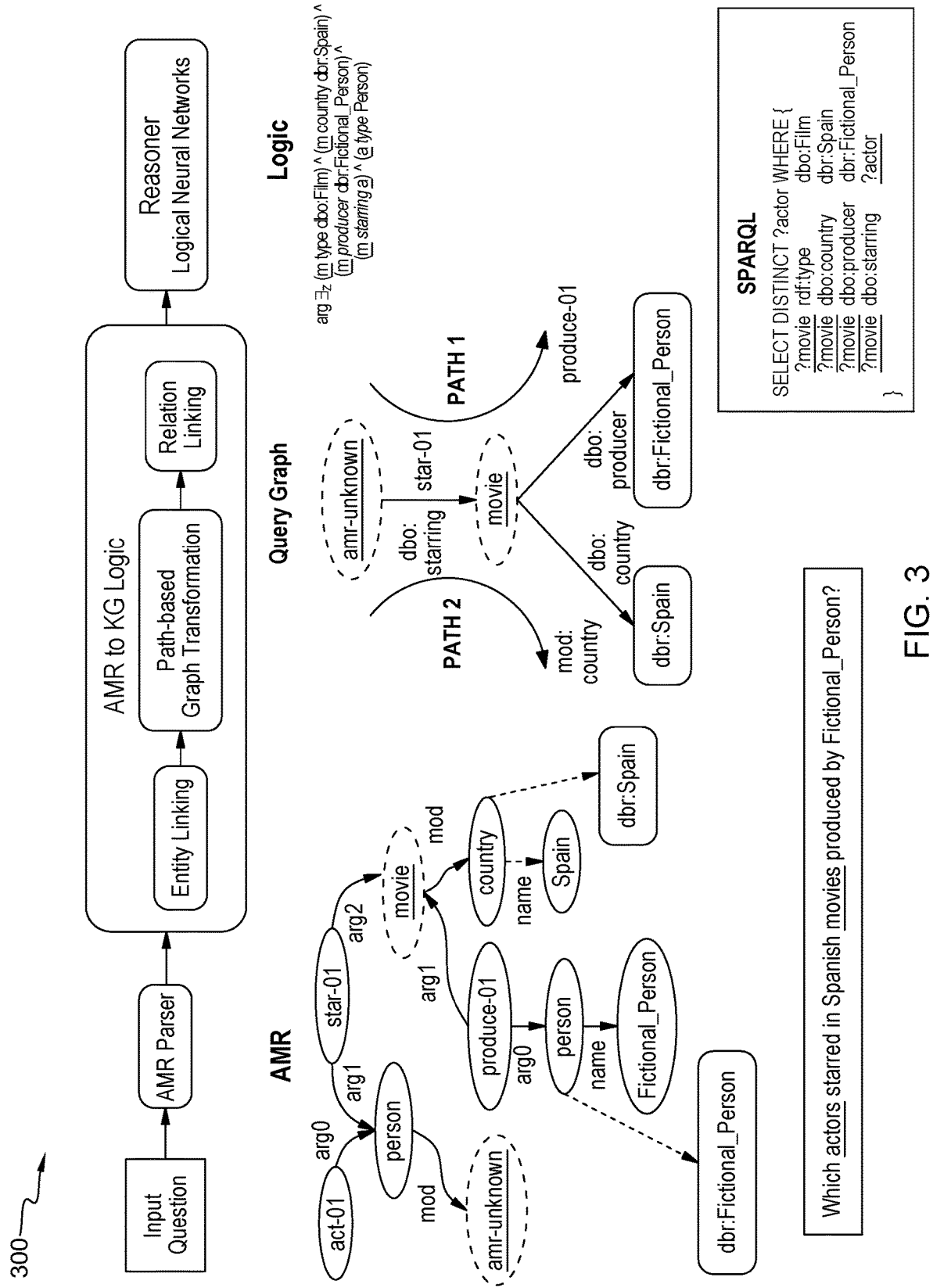
FIG. 3 illustrates operational steps of a program within the computational environment of FIG. 1, in accordance with an embodiment of the present invention.

As shown in FIG. 3, AMR provides a representation that is similar to the KB representation. A special amr-unknown node indicates the missing concept that represents the answer to the given question. In FIG. 3, amr-unknown is a person, who is the subject of act-01. Furthermore, AMR helps identify intermediate variables that behave as secondary unknowns. In this case, a movie produced by Fictional Person in Spain. In an embodiment, program 150 utilizes a stack-Transformer transition based model for AMR parsing. An advantage of transition-based systems is that said systems provide explicit question text to AMR node alignments allowing encoding closely integrated text and AMR input to multiple modules (Entity Linking and Relation Linking) that can benefit from this joint input.

Figure 4:
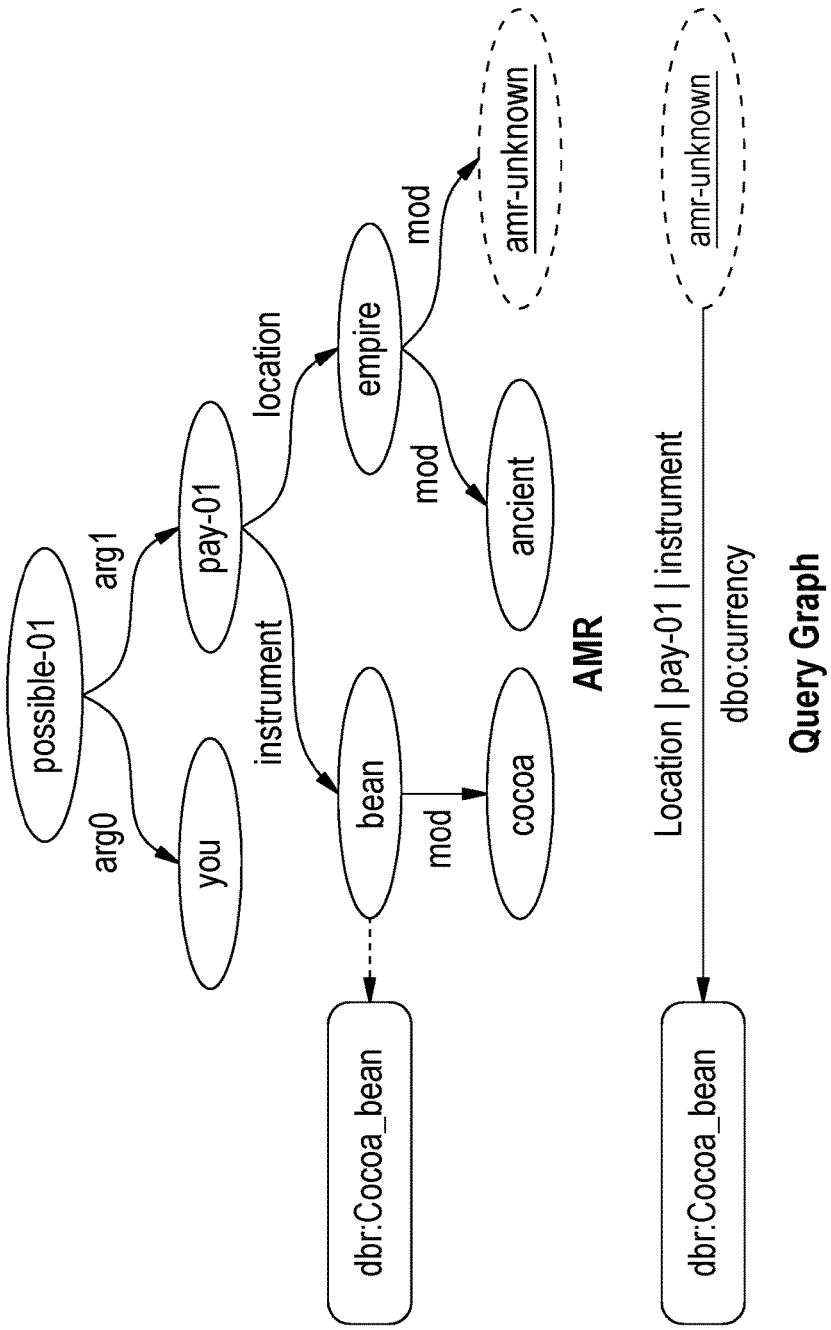
FIG. 4 depicts a query graph, in accordance with an embodiment of the present invention.

Program 150 transforms the AMR graph to a set of candidate knowledge base (KB)-aligned logical queries (step 206). Program 150 transforms the AMR graph (i.e., question) to a Query Graph Q aligned with the underlying knowledge graph. Query Graph Q is a directed edge-labeled graph $\langle V_Q, E_Q \rangle$, which has a similar structure to the underlying KG. $V_Q \in V_E \cup V$ where $V_E$ is a set of entities in the KG and V is a set of unbound variables. $E_Q$ is a set of binary relations among $V_Q$ from the KG. The Query Graph Q is essentially the WHERE clause in the SPARQL query, where the Query Graph Q does not include the type constraints in the SPARQL WHERE Clause. Query Graph Q represents information using binary relations, whereas AMR graph contain PropBank framesets that are n-ary. For example, the node produce-013 from $A_p$ in G has four possible arguments, whereas its corresponding KG relation in Q (dbo:producer) is a binary relation; structural and granular mismatch: the vertex set of the Query Graph Q represent entities or unbound variables. On the other hand, AMR Graph G contains nodes that are concepts or PropBank predicates which can correspond to both entities and relationships. For example, in FIG. 3, produce-01, star-01, and Spain are nodes in the AMR graph. So, the AMR Graph G has to be transformed such that nodes primarily correspond to entities and edges (edge labels) correspond to relationships. Furthermore, it is possible for multiple predicates and concepts from G to jointly represent a single binary relation in Q because the underlying KG uses a completely different vocabulary. An example of such granular mismatch is shown in FIG. 4.

In an embodiment, program 150 utilizes a path-based approach, depicted in FIG. 5, to transform the AMR Graph G into Query graph Q. As amr-unknown is the unknown variable in the AMR graph, program 150 retrieves all shortest paths (line 11 in FIG. 5) between the amr-unknown node and the nodes $V_E$ of the AMR Graph G that have mappings to the KG entity set. FIG. 3 shows an example of both the AMR and Query Graph for the question "Which actors starred in Spanish movies produced by Fictional Person?". Selecting the shortest paths reduces the n-ary predicates of AMR graph to only the relevant binary edges. For instance, the edge (act-01, arg0, person) in the AMR graph in FIG. 3 will be ignored because it is not in the path between amr-unknown and any of the entities dbr:Spain and dbr:Fictional_Person.

Structural and granularity mismatch between the AMR and query graph occurs when multiple nodes and edges in the AMR graph represent a single relationship in the query graph. This is shown in FIG. 4. The path consists of one AMR node and 2 edges between amr-unknown and cocoa bean: (amr-unknown, location, pay-01, instrument, cocoa-bean). In such cases, the present invention collapses all nodes that represent predicates (e.g., pay-01, star-01, etc.) into an edge, and combine it with surrounding edge labels, giving (location pay-01 instrument). This is done by line 18 of FIG. 5 where the eventual Query Graph Q will have one edge with merged predicated from AMR Graph G between the non-predicates ($A_C$).

Returning to the example in FIG. 3, FIG. 5 (line 25) outputs the Query Graph Q with the following two paths, which bear structural similarity to the knowledge graph: amr-unknown→star-01→movie→country→Spain and amr-unknown→star-01→movie→produce-01→Fictional_Person. Note that in the above paths, edge labels reflect the predicates from the AMR graph (star-01, produce-01, and mod). The next step is to resolve these edge labels to its corresponding relationships from the underlying KG. To do so, the program 150 performs relation linking as described below.

Relationship Linking. In an embodiment, program 150 uses SemREL, a state-of-the-art relation linking system that takes in the question text and AMR predicate as input and returns a ranked list of KG relationships for each triple. The cartesian product represents a ranked list of candidate query graphs, and the present invention selects the highest-ranked valid query graph (a KG subgraph with unbound variables). As shown in FIG. 3, the output of this module produces Query Graph Q with star-01 and produce-01 mapped to KB relations dbo:starring and dbo:producer. This will be the WHERE clause of the final SPARQL query Program 150 generates answers to KB-aligned logical queries by reasoning KB facts utilizing a logical neural network (LNN) (step 208). In an embodiment, program 150 directly translates the resulting Query Graph Q to the WHERE clause of the SPARQL. In this embodiment, program 150 uses existential first order logic (FOL) as an intermediate representation, where the non-logical symbols consist of the binary relations and entities in the KB as well as some additional functions to represent SPARQL query constructs (e.g., COUNT). Here, program 150 uses existential FOL instead of directly translating to SPARQL because: (a) it enables the use of any FOL reasoner in the art; (b) it is compatible with reasoning techniques beyond the scope of typical KBQA, such as temporal and spatial reasoning; (c) it can also be used as a step towards query embedding approaches that can handle incompleteness of knowledge graphs. In another embodiment, Query Graph Q is in conjunction with existential first order logic as shown in FIG. 3.

The current logic form supports SPARQL constructs such as SELECT, COUNT, ASK, and SORT which are reflected in the types of questions that program 150 is able to answer in FIG. 10. The heuristics program 150 utilizes to determine these constructs from AMR are follows:

In an embodiment, program 150 identifies a query type, wherein program 150 determines if the query will use the ASK or SELECT construct. Boolean questions will have AMR parses that either have no amr-unknown variable or have an amr-unknown variable connected to a polarity edge (indicating a true/false question). Responsively, program 150 returns ASK, otherwise program 150 returns SPARQL.

In an embodiment, program 150 generates a target variable, wherein program 150 determines the unbound variable that follows a SPARQL statement. As mentioned in the steps above, the amr-unknown node represents the missing concept in a question, so it is used as the target variable for the query. The one exception is for questions that have an AMR predicate that is marked as imperative, e.g., in FIG. 9 (center) a question beginning with "Count the awards . . ." will have count-01 marked as imperative. In these cases, the algorithm uses the arg1 of the imperative predicate as the target variable (see FIG. 5, line 3).

In an embodiment, program 150 determines the need for sorting by the presence of superlatives and quantities in the query graph prior to relation linking. Superlatives are parsed into AMR with most and least nodes and quantities are indicated by the PropBank frame have-degree-91, whose arguments determine: (1) which variable in V represents the quantity of interest, and (2) the direction of the sort (ascending or descending).

In an embodiment, program 150 determines if the COUNT aggregation function is needed by looking for Prop0Bank frame count-01 or AMR edge :quant connected to amr-unknown, indicating that the question seeks a numeric answer. However, questions such as "How many people live in London?" can have :quant associated to amr-unknown even though the correct query will use dbo:population to directly retrieve the numeric answer without the COUNT aggregation function. Program 150 therefore excludes the COUNT aggregation function if the KB relation corresponding to :quant or count-01 has a numeric type as its range.

Responsive to one or more generated queries, program 150 utilizes LNN 152 to eliminate queries based on inconsistencies with the type hierarchy in the KB. For example, a question like "Was Fictional Person born in United States?" requires geographic reasoning because the entities related to dbo:birthPlace are generally cities, but the question requires a comparison of countries. In this example, program 150 manually adds logical axioms to perform the required transitive reasoning for property dbo:birthPlace. Program 150 utilizes the intermediate logic and reasoning module to allow program 150 to be extended for complex reasoning.

Program 150 provides generated answers (step 210). In an embodiment, program 150 executes the queries generated in step 208 and retrieves a set of answers or KB facts from the KB. In some embodiments, program 150 transmits the retrieved answers to a user computing device using a plurality of transmission methods including, but not limited to, GUI prompt, short message service (SMS), email, push notification, automated phone call, text-to-speech etc. For example, a user receives an answer on an associated user computing device after transmitting a natural language. In one embodiment, program 150 utilizes text-to-speech methods to provide auditory answers to the user. In this embodiment, program 150 utilizes NLP to receive and analyze the user response to the provided answer. For example, after program 150 transmits a wrong answer, the user can provide feedback (e.g., the intended answer) and/or an error score to LNN 152.

FIG. 3 depicts pipeline 300 illustrating the steps of program 150 (i.e., NSQA system), in accordance with an illustrative embodiment of the present invention. Responsive to a provided question in natural language, program 150 parses questions into an Abstract Meaning Representation (AMR) graph (step 204); transforms the AMR graph to a set of candidate KB-aligned logical queries, via a novel but simple graph transformation approach (step 206); and uses a Logical Neural Network (LNN) to reason over KB facts and produce answers to KB-aligned logical queries (step 208). Pipeline 300 demonstrates program 150 processing the NSQA prediction for the sentence "Which actors starred in Spanish movies produced by Fictional Person?". In underlined, pipeline 300 shows the representation for the two unknown variables across all stages including: AMR-aligned tokens in sentence (Which, movies), AMR graph (unknown, movie), paths representation (same as AMR), logical representation (actor, movie) and SPARQL interpretation (?actor, ?movie).

FIG. 4 depicts query graph 400, in accordance with an illustrative embodiment of the present invention. Query graph 400 depicts an example of granularity and structural mismatch between AMR and query graphs of the question "In which ancient empire could you pay with cocoa beans?". The binary relation dbo:currency corresponds to the combination of two edges (location, instrument) and one node (pay-01) in the AMR graph.

FIG. 5 depicts algorithm 500, in accordance with an illustrative embodiment of the present invention. Algorithm 500 depicts the operational steps of program 150.

FIG. 6 depicts table 600, in accordance with an illustrative embodiment of the present invention. Table 600 shows the performance of program 150 compared to state-of-the-art approaches on QALD and LC-QuAD 1.0 datasets. On QALD-9 and LC-QuAD 1.0, NSQA achieves state-of-the-art performance. Program 150 outperforms WDAqua and gAnswer on QALD-9. Furthermore, program 150 performance on LC-QuAD 1.0 significantly outperforms QAmp by 11.45 percentage points on F1. Due to difference in evaluation setup in the prior art, the program 150 reevaluated itself on the same setup and metrics as the above systems. Given the test set and the evaluation, Liang's F1 score reduces to 29.2%.

FIG. 7 depicts table 700, in accordance with an illustrative embodiment of the present invention. Table 700 demonstrates AMR parsing performance (Smatch) on the AMR3.0 test and QALD-9, LC-QuAD 1.0 dev sets. The parser is trained on the combination of human annotated treebanks and a synthetic AMR corpus. Human annotated treebanks include AMR3.0 and 877 questions sentences (250 QALD train+627 LC-QuAD 1.0 train sentences) annotated inhouse. The synthetic AMR corpus includes 27 k sentences obtained by parsing LC-QuAD 1.0 and LC-QuAD 2.0 training sentences.

FIG. 8 depicts table 800, in accordance with an illustrative embodiment of the present invention. Tables 800 shows the accuracy of each one of these rules on LC-QuAD 1.0 dev dataset. Overall, program 150 identified 64% of ASK (boolean) questions correctly and achieved more than 80% accuracy for COUNT and SELECT questions. Using AMR and the path-based approach, program 150 was able to correctly predict the total number of constraints with comparable accuracies of 79% and 70% for single and two-hops, respectively. Program 150 finds the correct query structure for complex questions almost as often as for simple questions, completely independent of the KG.

Figure 9:
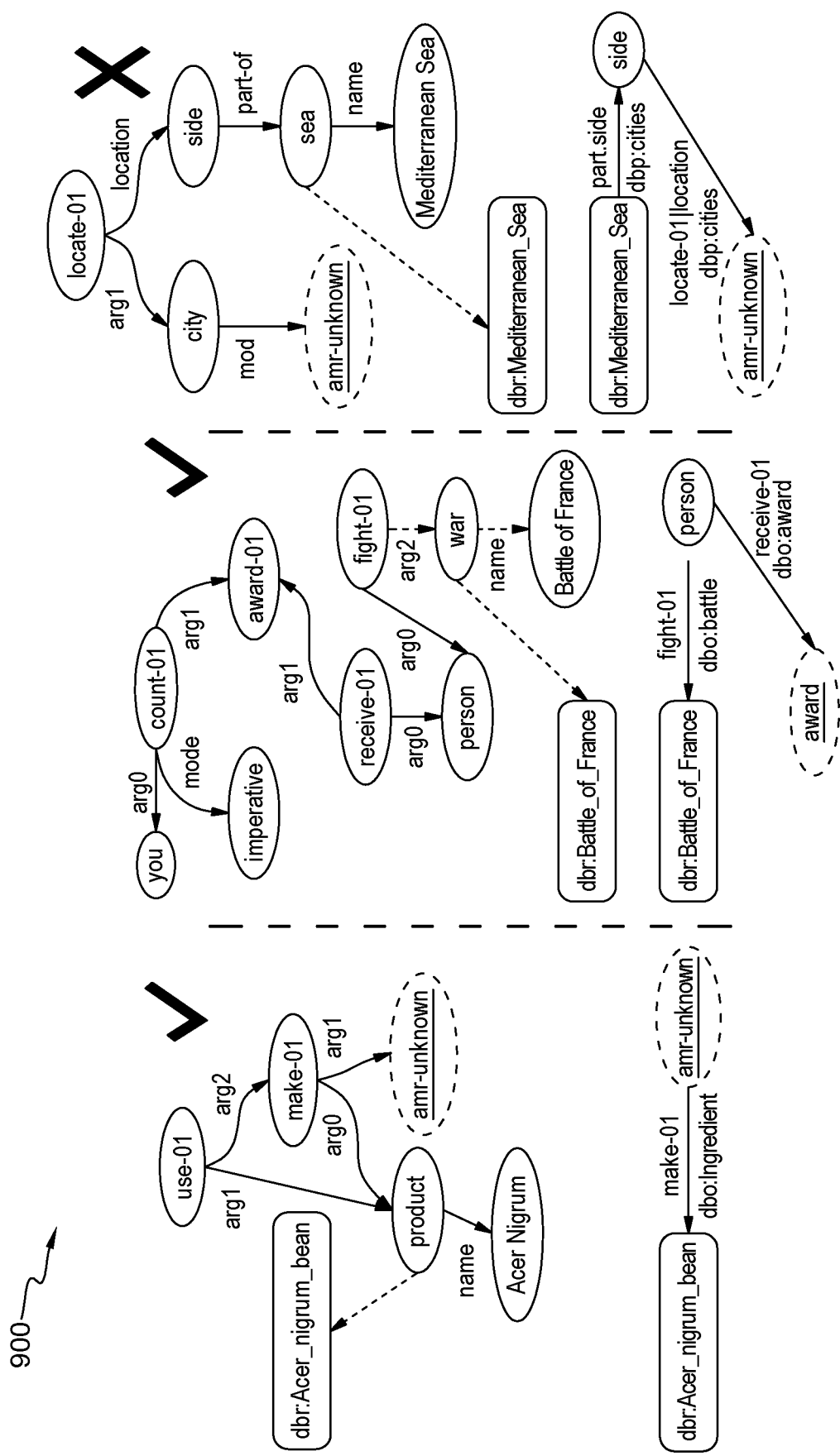
FIG. 9 depicts query graphs, in accordance with an embodiment of the present invention.

FIG. 9 depicts query graphs 900, in accordance with an illustrative embodiment of the present invention. Query graph 900 illustrates two examples illustrating how AMR lends itself to an intuitive transformation to the correct query graph, as well as a third example of failure. Here the AMR semantic parse cannot be matched to the underlying KG, since 'side' is an extra intermediate variable that leads to an additional constraint in the query graph. Query graph 900 demonstrates AMR and query graphs for the questions "Acer nigrum is used in making what?", "Count the awards received by the ones who fought the battle of France?" and "What cities are located on the sides of Mediterranean Sea?" from LC-QuAD 1.0 dev set.

FIG. 10 depicts table 1000, in accordance with an illustrative embodiment of the present invention. Table 1000 shows the reasoning and question types supported by program 150. The transformation algorithm of program 150 is applied to AMR parses supports simple, multi-relational, count-based, and superlative question types. LNN 152 performs geographic reasoning as well as type-based reasoning to rank candidate logic forms. Addressing comparative and temporal reasoning is a part of future embodiments.

FIG. 11 depicts table 1100, in accordance with an illustrative embodiment of the present invention. Table 1100 shows the performance of NMD+BLINK approach with Falcon. NMD+BLINK performs 24% better on F1 than Falcon (state-of-the-art) on LC-QuAD 1.0 dev set and 3% better on QALD-9 dev set. Similarly, program 150 evaluates Relation Linking on both QALD and LC-QuAD 1.0 dev sets. In particular, program 150 used Sem-REL (Naseem et al., 2021); state-of-the-art relation linking approach which performs significantly better compared to both Falcon and SLING on various datasets. On LC-QuAD 1.0 dev, SemREL achieves F1=0.55 compared to 0.43 by SLING and 0.42 by Falcon. On QALD-9, SemREL achieves 0.54 compared to 0.64 and 0.46 F1 for SLING and Falcon, respectively.

Further Comments and/or Embodiments

Knowledge base question answering (KBQA) is an important task in Natural Language Processing. Existing approaches face significant challenges including complex question understanding, necessity for reasoning, and lack of large end-to-end training datasets. In this work, embodiments of the present invention propose Neuro-Symbolic Question Answering (NSQA), a modular KBQA system, that leverages (1) Abstract Meaning Representation (AMR) parses for task-independent question understanding; (2) a simple yet effective graph transformation approach to convert AMR parses into candidate logical queries that are aligned to the KB; (3) a pipeline-based approach which integrates multiple, reusable modules that are trained specifically for their individual tasks (semantic parser, entity and relationship linkers, and neuro-symbolic reasoner) and do not require end-to-end training data. NSQA achieves state-of-the-art performance on two prominent KBQA datasets based on DBpedia (QALD-9 and LC-QuAD 1.0). Furthermore, embodiments of the present invention emphasize that AMR is a powerful tool for KBQA systems.

1 Introduction

Knowledge base question answering (KBQA) is a subfield within Question Answering with desirable characteristics for real-world applications. KBQA requires a system to answer a natural language question based on facts available in a Knowledge Base (KB) (Zou et al., 2014; Vakulenko et al., 2019; Diefenbach et al., 2020; Abdelaziz et al., 2021). Facts are retrieved from a KB through structured queries (in a query language such as SPARQL), which often contain multiple triples that represent the steps or antecedents required for obtaining the answer. This enables a transparent and self-explanatory form of QA, meaning that intermediate symbolic representations capture some of the steps from natural language question to answer.

With the rise of neural networks in NLP, various KBQA models approach the task in an end-to-end manner. Many of these approaches formulate text-to-query-language as sequence-to-sequence problem, and thus require sufficient examples of paired natural language and target representation pairs. However, labeling large amounts of data for KBQA is challenging, either due to the requirement of expert knowledge (Usbeck et al., 2017), or artifacts introduced during automated creation (Trivedi et al., 2017). Real-world scenarios require solving complex multi-hop questions i.e., secondary unknowns within a main question and questions employing unusual expressions. Pipeline approaches can delegate language understanding to pretrained semantic parsers, which mitigates the data problem, but are considered to suffer from error propagation. However, the performance of semantic parsers for well-established semantic representations has greatly improved in recent years. Abstract Meaning Representation (AMR) (Banarescu et al., 2013; Dorr et al., 1998) parsers recently reached above 84% F-measure (Bevilacqua et al., 2021), an improvement of over 10 points in the last three years.

Embodiments of the present invention propose Neuro-Symbolic Question Answering (NSQA), a modular knowledge base question answering system with the following objectives: (a) delegating the complexity of understanding natural language questions to AMR parsers; (b) reducing the need for end-to-end (text-to-SPARQL) training data with a pipeline architecture where each module is trained for its specific sub-task; and (c) facilitating the use of an independent reasoner via an intermediate logic form.

The contributions of this work are as follows: the first system to use Abstract Meaning Representation for KBQA achieving state of the art performance on two prominent datasets on DBpedia (QALD-9 and LC-QuAD 1.0); a novel, simple yet effective path-based approach that transforms AMR parses into intermediate logical queries that are aligned to the KB. This intermediate logic form facilitates the use of neuro-symbolic reasoners such as Logical Neural Networks (Riegel et al., 2020), paving the way for complex reasoning over knowledge bases; and a pipeline-based modular approach that integrates multiple, reusable modules that are trained specifically for their individual tasks (e.g., semantic parsing, entity linking, and relationship linking) and hence do not require end-to-end training data.

2 Approach Overview

FIG. 3 depicts the pipeline of the present invention (i.e., NSQA system). Given a question in natural language, the present invention: (i) parses questions into an Abstract Meaning Representation (AMR) graph; (ii) transforms the AMR graph to a set of candidate KB-aligned logical queries, via a novel but simple graph transformation approach; (iii) uses a Logical Neural Network (LNN) to reason over KB facts and produce answers to KB-aligned logical queries. Embodiments of the present invention describe each of these modules in the following sections.

2.1 AMR Parsing

NSQA utilizes AMR parsing to reduce the complexity and noise of natural language questions. An AMR parse is a rooted, directed, acyclic graph. AMR nodes represent concepts, which may include normalized surface symbols, PropBank frames (Kingsbury and Palmer, 2002) as well as other AMR-specific constructs to handle named entities, quantities, dates and other phenomena. Edges in an AMR graph represent the relations between concepts such as standard OntoNotes roles but also AMR specific relations such as polarity or mode.

As shown in FIG. 3, AMR provides a representation that is fairly close to the KB representation. A special amr-unknown node indicates the missing concept that represents the answer to the given question. In the example of FIG. 3, amr-unknown is a person, who is the subject of act-01. Furthermore, AMR helps identify intermediate variables that behave as secondary unknowns. In this case, a movie produced by Fictional Person in Spain.

NSQA utilizes a stack-Transformer transition based model (Naseem et al., 2019; Astudillo et al., 2020) for AMR parsing. An advantage of transition-based systems is that they provide explicit question text to AMR node alignments. This allows encoding closely integrated text and AMR input to multiple modules (Entity Linking and Relation Linking) that can benefit from this joint input.

2.2 AMR to KG Logic

The core contribution of this invention is the step where the AMR of the question is transformed to a query graph aligned with the underlying knowledge graph. The present invention formalizes the two graphs as follows.

AMR Graph G is a rooted edge-labeled directed acyclic graph $\langle V_G, E_G \rangle$. The edge set $E_G$ consists of non-core roles, quantifiers, and modifiers. The vertex set $V_G \in$ amr-unknown$\cup A_P \cup A_C$ where $A_P$ are set of PropBank predicates and $A_C$ are rest of the nodes. PropBank predicates are n-ary with multiple edges based on their definitions. amr-unknown is a special concept node in the AMR indicating wh-questions.

Further, we enrich the AMR Graph G with explicit links to entities in the knowledge graph (KG). For example, the question in FIG. 3 contains two entities Spain and Fictional Person that need to be identified and linked to DBpedia entries, dbr:Spain and dbr:Fictional_Person. Linking these entities is absolutely necessary for any KBQA (Zou et al., 2014; Vakulenko et al., 2019). To do so, we trained a BERT-based neural mention detection model and used BLINK (Devlin et al., 2018) for disambiguation. The entities are linked to AMR nodes based on the AMR node-text alignment information. The linking is a bijective mapping from $V_e \rightarrow E$ where $V_e$ is the set of AMR entity nodes, and E is the set of entities in the underlying KG.

Query graph Q is a directed edge-labeled graph $\langle V_Q, E_Q \rangle$, which has a similar structure to the underlying KG. $V_Q \in V_E \cup V$ where $V_E$ is a set of entities in the KG and V is a set of unbound variables. $E_Q$ is a set of binary relations among $V_Q$ from the KG. The Query graph Q is essentially the WHERE clause in the SPARQL query, where the Query graph Q does not include the type constraints in the SPARQL WHERE Clause.

The goal of the present invention is to transform the AMR Graph G into its corresponding query graph Q. However, such transformation faces the following challenges: n-ary argument mismatch: Query Graph Q represents information using binary relations, whereas AMR graph contain PropBank framesets that are n-ary. For example, the node produce-013 from $A_p$ in G has four possible arguments, whereas its corresponding KG relation in Q (dbo:producer) is a binary relation; structural and granular mismatch: The vertex set of the Query Graph Q represent entities or unbound variables. On the other hand, AMR Graph G contains nodes that are concepts or PropBank predicates which can correspond to both entities and relationships. For example, in FIG. 3, produce-01, star-01, and Spain are nodes in the AMR graph. So, the AMR Graph G has to be transformed such that nodes primarily correspond to entities and edges (edge labels) correspond to relationships. Furthermore, it is possible for multiple predicates and concepts from G to jointly represent a single binary relation in Q because the underlying KG uses a completely different vocabulary. An example of such granular mismatch is shown in FIG. 4.

2.2.1 Path-Based Graph Transformation

The present invention addresses the challenges mentioned above by using a path-based approach for the construction of query graphs. In KBQA, query graphs (i.e., SPARQL queries) constrain the unknown variable based on paths to the grounded entities. In FIG. 1, the constraints in the SPARQL query are based on paths from ?actor to dbr:Fictional_Person and dbr:Spain as shown below.

Based on this intuition of finding paths from the unknown variable to the grounded entities, the present invention has developed a path-based approach depicted in FIG. 5 that shows the steps for transforming the AMR Graph G into Query Graph Q. As amr-unknown is the unknown variable in the AMR Graph, the present invention retrieves all shortest paths (line 11 in FIG. 5) between the amr-unknown node and the nodes $V_E$ of the AMR Graph G that have mappings to the KG entity set. FIG. 3 shows an example of both the AMR Graph and query graph for the question "Which actors starred in Spanish movies produced by Fictional Person?". Selecting the shortest paths reduces the n-ary predicates of AMR graph to only the relevant binary edges. For instance, the edge (act-01, arg0, person) in the AMR graph in FIG. 3 will be ignored because it is not in the path between amr-unknown and any of the entities dbr:Spain and dbr:Fictional_Person.

Structural and granularity mismatch between the AMR and query graph occurs when multiple nodes and edges in the AMR graph represent a single relationship in the query graph. This is shown in FIG. 4. The path consists of one AMR node and 2 edges between amr-unknown and cocoa bean: (amr-unknown, location, pay-01, instrument, cocoa-bean). In such cases, the present invention collapses all nodes that represent predicates (e.g., pay-01, star-01, etc.) into an edge, and combine it with surrounding edge labels, giving (location|pay-01|instrument). This is done by line 18 of FIG. 5 where the eventual Query Graph Q will have one edge with merged predicated from AMR Graph G between the non-predicates ($A_C$).

Returning to the example in FIG. 3, FIG. 5 (line 25) outputs the Query Graph Q with the following two paths, which bear structural similarity to the knowledge graph: amr-unknown→star-01→movie→country→Spain and amr-unknown→star-01→movie→produce-01→Fictional_Person.

Note that in the above paths, edge labels reflect the predicates from the AMR graph (star-01, produce-01, and mod). The next step is to resolve these edge labels to its corresponding relationships from the underlying KG. To do so, the present invention performs relation linking as described below.

Relationship Linking. NSQA uses SemREL, a state-of-the-art relation linking system that takes in the question text and AMR predicate as input and returns a ranked list of KG relationships for each triple. The cartesian product of this represents a ranked list of candidate query graphs, and the present invention chooses the highest-ranked valid query graph (a KG subgraph with unbound variables). As shown in FIG. 3, the output of this module produces Query Graph Q with star-01 and produce-01 mapped to DBpedia relations dbo:starring and dbo:producer. This will be the WHERE clause of the final SPARQL query.

2.2.2 Logic Generation

The query graph can be directly translated to the WHERE clause of the SPARQL. The present invention uses existential first order logic (FOL) as an intermediate representation, where the non-logical symbols consist of the binary relations and entities in the KB as well as some additional functions to represent SPARQL query constructs (e.g., COUNT). The present invention uses existential FOL instead of directly translating to SPARQL because: (a) it enables the use of any FOL reasoner which the present invention demonstrates in Section 2.3; (b) it is compatible with reasoning techniques beyond the scope of typical KBQA, such as temporal and spatial reasoning; (c) it can also be used as a step towards query embedding approaches that can handle incompleteness of knowledge graphs. The Query Graph from Section 2 can be as a conjunction in existential first order logic as shown in FIG. 3.

The current logic form supports SPARQL constructs such as SELECT, COUNT, ASK, and SORT which are reflected in the types of questions that the present invention is able to answer in FIG. 10. The heuristics to determine these constructs from AMR are as follows:

Query Type: This rule determines if the query will use the ASK or SELECT construct. Boolean questions will have AMR parses that either have no amr-unknown variable or have an amr-unknown variable connected to a polarity edge (indicating a true/false question). In such cases, the rule returns ASK, otherwise it returns SPARQL.

Target Variable: This rule determines what unbound variable follows a SPARQL statement. As mentioned in Section 2, the amr-unknown node represents the missing concept in a question, so it is used as the target variable for the query. The one exception is for questions that have an AMR predicate that is marked as imperative, e.g. in FIG. 9 (center) a question beginning with "Count the awards . . . " will have count-01 marked as imperative. In these cases, the algorithm uses the arg1 of the imperative predicate as the target variable (see FIG. 5, line 3).

Sorting: This rule detects the need for sorting by the presence of superlatives and quantities in the query graph prior to relation linking. Superlatives are parsed into AMR with most and least nodes and quantities are indicated by the PropBank frame have-degree-91, whose arguments determine: (1) which variable in V represents the quantity of interest, and (2) the direction of the sort (ascending or descending).

Counting: This rule determines if the COUNT aggregation function is needed by looking for PropBank frame count-01 or AMR edge :quant connected to amr-unknown, indicating that the question seeks a numeric answer. However, questions such as "How many people live in London?" can have :quant associated to amr-unknown even though the correct query will use dbo:population to directly retrieve the numeric answer without the COUNT aggregation function. The present invention therefore excludes the COUNT aggregation function if the KB relation corresponding to :quant or count-01 has a numeric type as its range.

2.3 Reasoner

With the motivation of utilizing modular, generic systems, NSQA uses a First Order Logic, neuro-symbolic reasoner called Logical Neural Networks (LNN). This module currently supports two types of reasoning: type-based, and geographic. Type-based reasoning is used to eliminate queries based on inconsistencies with the type hierarchy in the KB. On the other hand, a question like "Was Fictional Person born in United States?" requires geographic reasoning because the entities related to dbo:birthPlace are generally cities, but the question requires a comparison of countries. This is addressed by manually adding logical axioms to perform the required transitive reasoning for property dbo:birthPlace. The present invention emphasizes that the intermediate logic and reasoning module allow for NSQA to be extended for such complex reasoning in future work.

3 Experimental Evaluation

The goal of the work is to show the value of AMR as a generic semantic parser on a modular KBQA system. In order to evaluate this, the present invention first performs an end-to-end evaluation of NSQA (Section 3.2). Next, the present invention presents qualitative and quantitative results on the value of AMR for different aspects of the present invention (Section 3.3). Finally, in support of the modular architecture of the present invention, the present invention evaluates the individual modules that are used in comparison to other state of the art approaches (Section 3.4).

3.1 Dataset and Metrics

To evaluate NSQA, we used two standard KBQA datasets on DBpedia. QALD-9 dataset has 408 training and 150 test questions in natural language, from DBpedia version 2016-10. Each question has an associated SPARQL query and gold answer set. FIG. 10 shows examples of all the question types in the QALD dev set. LC-QuAD 1.0 is a dataset with 5,000 questions based on templates and more than 80% of its questions contains two or more relations. The present invention is evaluated against a random sample of 200 questions from the training set. LC-QuAD 1.0 predominantly focuses on the multi-relational questions, aggregation (e.g., COUNT) and simple questions from FIG. 10. Dev Set. The present invention also created a randomly chosen development set of 98 QALD-9 and 200 LC-QuAD 1.0 questions for evaluating individual modules. Metrics: the present invention reports performance based on standard precision, recall and F-score metrics for the KBQA system and other modules. For the AMR parser the present invention uses the standard Smatch metric.

3.2 End-to-End Evaluation

Baselines: The present invention evaluates NSQA against four systems: GAnswer, QAmp, WDAqua-core1, and a recent approach by (Liang et al., 2021). GAnswer is a graph data-driven approach and is the state-of-the-art on the QALD dataset. QAmp is another graph-driven approach based on message passing and is the state-of-the-art on LC-QuAD 1.0 dataset. WDAqua-core1 is knowledge base agnostic approach that, to the best of the present invention, is the only technique that has been evaluated on both QALD-9 and LC-QuAD 1.0 on different versions of DBpedia. Lastly, Liang et al. is a recent approach that uses an ensemble of entity and relation linking modules and train a Tree-LSTM model for query ranking.

Results: FIG. 6 shows the performance of NSQA compared to state-of-the-art approaches on QALD and LC-QuAD 1.0 datasets. On QALD-9 and LC-QuAD 1.0, NSQA achieves state-of-the-art performance. It outperforms WDAqua and gAnswer on QALD-9. Furthermore, present invention performance on LC-QuAD 1.0 significantly outperforms QAmp by 11.45 percentage points on F1. Due to difference in evaluation setup in Liang et al. (2021), the present invention reevaluated their system on the same setup and metrics as the above systems. Given the test set and the evaluation, (Liang et al., 2021)'s F1 score reduces to 29.2%[5]. The present invention excludes this work from comparison due to lack of standard evaluation.

3.3 Performance Analysis of Amr

AMR Parsing. The present invention manually created AMRs for the train and dev sets of QALD and LC-QuAD 1.0 questions. The performance of the stack-transformer parser on both of these datasets is shown in FIG. 7. The parser is trained on the combination of human annotated treebanks and a synthetic AMR corpus. Human annotated treebanks include AMR3.0 and 877 questions sentences (250 QALD train+627 LC-QuAD 1.0 train sentences) annotated in-house. The synthetic AMR corpus includes 27 k sentences obtained by parsing LC-QuAD 1.0 and LC-QuAD 2.0 (Dubey et al., 2019) training sentences, along the lines of (Lee et al., 2020).

AMR-based Query Structure NSQA leverages many of the AMR features to decide on the correct query structure. As shown in Section 2.2.2, NSQA relies on the existence of certain PropBank predicates in the AMR parse such as have-degree-91, count-01, amr-unknown to decide on which SPARQL constructs to add. In addition, the AMR parse determines the structure of the WHERE clause. FIG. 8 shows the accuracy of each one of these rules on LC-QuAD 1.0 dev dataset. Overall, NSQA identified 64% of ASK (boolean) questions correctly and achieved more than 80% accuracy for COUNT and SELECT questions. Using AMR and the path-based approach, NSQA was able to correctly predict the total number of constraints with comparable accuracies of 79% and 70% for single and two-hops, respectively. NSQA finds the correct query structure for complex questions almost as often as for simple questions, completely independent of the KG.

FIG. 9 shows two examples illustrating how AMR lends itself to an intuitive transformation to the correct query graph, as well as a third example of failure. Here the AMR semantic parse cannot be matched to the underlying KG, since 'side' is an extra intermediate variable that leads to an additional constraint in the query graph.

Supported Question Types. FIG. 10 shows the reasoning and question types supported by NSQA. The transformation algorithm of the present invention is applied to AMR parses supports simple, multi-relational, count-based, and superlative question types. LNN performs geographic reasoning as well as type-based reasoning to rank candidate logic forms. Addressing comparative and temporal reasoning is a part of future embodiments.

3.4 Individual Module Evaluation

Entity and Relation Linking. NSQA's EL module (NMD+BLINK) consists of a BERT-based neural mention detection (NMD) network, trained on LC-QuAD 1.0 training dataset comprising of 3,651 questions with manually annotated mentions, paired with an off-the-shelf entity disambiguation model—BLINK (Wu et al., 2019b). The present invention compares the performance of NMD+BLINK approach with Falcon (Sakor et al., 2019) in FIG. 11. NMD+BLINK performs 24% better on F1 than Falcon (state-of-the-art) on LC-QuAD 1.0 dev set and 3% better on QALD-9 dev set. Similarly, the present invention evaluates Relation Linking on both QALD and LC-QuAD 1.0 dev sets. In particular, we used Sem-REL (Naseem et al., 2021); state-of-the-art relation linking approach which performs significantly better compared to both Falcon (Sakor et al., 2019) and SLING (Mihindukulasooriya et al., 2020) on various datasets. On LC-QuAD 1.0 dev, SemREL achieves F1=0.55 compared to 0.43 by SLING and 0.42 by Falcon. On QALD-9, SemREL achieves 0.54 compared to 0.64 and 0.46 F1 for SLING and Falcon, respectively.

Reasoner. The present invention investigates the effect of using LNN as a reasoner equipped with axioms for type-based and geographic reasoning. The present invention evaluated NSQA's performance under two conditions: (a) with an LNN reasoner with intermediate logic form and (b) with a deterministic translation of query graphs to SPARQL.

On LC-QuAD 1.0 dev set, NSQA achieves an F1 score of 40.5 using LNN compared to 37.6 with the deterministic translation to SPARQL. Based on these initial promising results, the present invention intends to explore more uses of such reasoners for KBQA in the future.

4 Related Work

Early work in KBQA focused mainly on designing parsing algorithms and (synchronous) grammars to semantically parse input questions into KB queries (Zettlemoyer and Collins, 2007; Berant et al., 2013), with a few exceptions from the information extraction perspective that directly rely on relation detection (Yao and Van Durme, 2014; Bast and Haussmann, 2015). All the above approaches train statistical machine learning models based on human-crafted features and the performance is usually limited.

Deep Learning Models. The renaissance of neural models significantly improved the accuracy of KBQA systems (Yu et al., 2017; Wu et al., 2019a). Recently, the trend favors translating the question to its corresponding subgraph in the KG in an end-to-end learnable fashion, to reduce the human efforts and feature engineering. This includes two most commonly adopted directions: (1) embedding-based approaches to make the pipeline end-to-end differentiable (Bordes et al., 2015; Xu et al., 2019); (2) hard-decision approaches that generate a sequence of actions that forms the subgraph (Xu et al., 2018; Bhutani et al., 2019).

On domains with complex questions, like QALD and LC-QuAD, end-to-end approaches with hard-decisions have also been developed. Some have primarily focused on generating SPARQL sketches (Maheshwari et al., 2019; Chen et al., 2020) where they evaluate these sketches (2-hop) by providing gold entities and ignoring the evaluation of selecting target variables or other aggregation functions like sorting and counting. (Zheng and Zhang, 2019) generates the question subgraph via filling the entity and relationship slots of 12 predefined question template. The performance on these datasets shows significant improvement due to the availability of these manually created templates. Having the advantage of predefined templates does not qualify for a common ground to be compared to generic and non-template based approaches such as NSQA, WDAqua, and QAmp.

Graph Driven Approaches. Due to the lack of enough training data for KBQA, several systems adopt a training-free approach. WDAqua (Diefenbach et al., 2017) uses a pure rule-based method to convert a question to its SPARQL query. gAnswer (Zou et al., 2014) uses a graph matching algorithm based on the dependency parse of question and the knowledge graph. QAmp (Vakulenko et al., 2019) is a graph-driven approach that uses message passing over the KG subgraph containing all identified entities/relations where confidence scores get propagated to the nodes corresponding to the correct answers. Finally, (Mazzeo and Zaniolo, 2016) achieved superior performance on QALD-5/6 with a hand-crafted automaton based on human analysis of question templates. A common theme of these approaches is that the process of learning the subgraph of the question is heavily KG specific, while the present invention first delegates the question understanding to KG-independent AMR parsing.

Modular Approaches. Frankenstein (Singh et al., 2018) is a system that emphasize the aspect of reusability where the system learns weights for each reusable component conditioned on the questions. They neither focus on any KG-independent parsing (AMR) not their results are comparable to any state of the art approaches. (Liang et al., 2021) propose a modular approach for KBQA that uses an ensemble of phrase mapping techniques and a TreeLSTM-based model for ranking query candidates which requires task specific training data.

5 Discussion

The use of semantic parses such as AMR compared to syntactic dependency parses provides a number of advantages for KBQA systems. First, independent advances in AMR parsing that serve many other purposes can improve the overall performance of the system. For example, on LC-QUAD-1 dev set, a 1.4% performance improvement in AMR Smatch improved the overall system's performance by 1.2%. Recent work also introduces multi-lingual and domain-specific (biomedical) AMR parsers, which expands the possible domains of application for this work. Second, AMR provides a normalized form of input questions that makes NSQA resilient to subtle changes in input questions with the same meaning. Finally, AMR also transparently handles complex sentence structures such as multi-hop questions or imperative statements.

Nevertheless, the use of AMR semantic parses in NSQA comes with its own set of challenges:

1) Error propagation: Although AMR parsers are very performant (state-of-the-art model achieves an Smatch of over 84%), inter-annotator agreement is only 83% on newswire sentences, as noted in (Banarescu et al., 2013). Accordingly, AMR errors can propagate in NSQA's pipeline and cause errors in generating the correct answer, 2) Granularity mismatch: the present invention utilization of path-based AMR transformation is generic and not driven by any domain-specific motivation, but additional adjustments to the algorithm may be needed in new domains due to the different granularity between AMR and SPARQL, and 3) Optimization mismatch: Smatch, the optimization objective for AMR training, is sub-optimal for KBQA. NSQA requires a particular subset of paths to be correctly extracted, whereas the standard AMR metric Smatch focuses equally on all edge-node triples. Embodiments are therefore exploring alternative metrics and how to incorporate them into model training.

Figure 12:
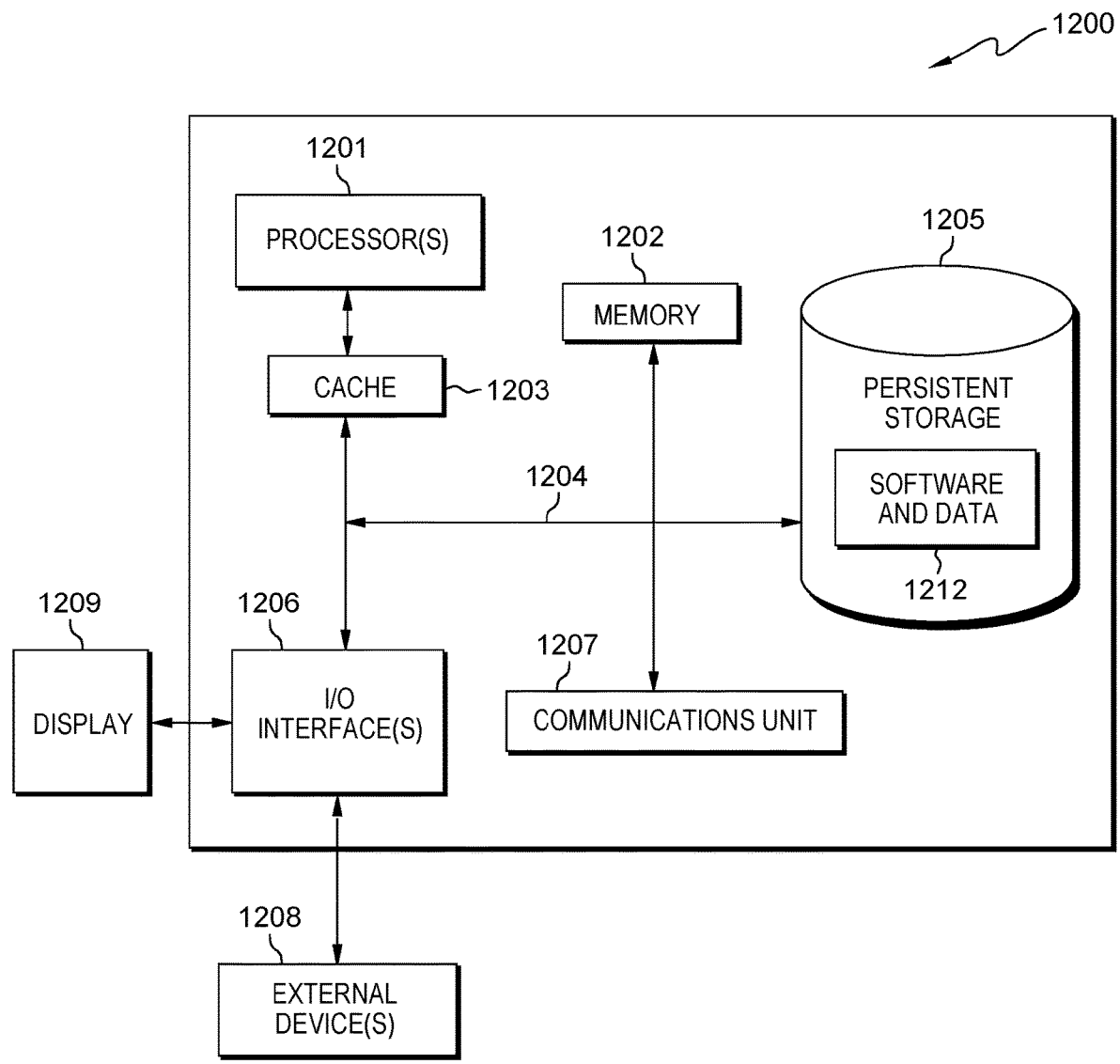
FIG. 12 is a block diagram of components of the server computer, in accordance with an embodiment of the present invention.

FIG. 12 depicts block diagram 1200 illustrating components of server computer 120 in accordance with an illustrative embodiment of the present invention. It should be appreciated that FIG. 12 provides only an illustration of one implementation and does not imply any limitations with regard to the environments in which different embodiments may be implemented. Many modifications to the depicted environment may be made.

Server computer 120 each include communications fabric 1204, which provides communications between cache 1203, memory 1202, persistent storage 1205, communications unit 1207, and input/output (I/O) interface(s) 1206. Communications fabric 1204 can be implemented with any architecture designed for passing data and/or control information between processors (such as microprocessors, communications, and network processors, etc.) system memory, peripheral devices, and any other hardware components within a system. For example, communications fabric 1204 can be implemented with one or more buses or a crossbar switch.

Memory 1202 and persistent storage 1205 are computer readable storage media. In this embodiment, memory 1202 includes random access memory (RAM). In general, memory 1202 can include any suitable volatile or non-volatile computer readable storage media. Cache 1203 is a fast memory that enhances the performance of computer processor(s) 1201 by holding recently accessed data, and data near accessed data, from memory 1202.

Program 150 may be stored in persistent storage 1205 and in memory 1202 for execution by one or more of the respective computer processor(s) 1201 via cache 1203. In an embodiment, persistent storage 1205 includes a magnetic hard disk drive. Alternatively, or in addition to a magnetic hard disk drive, persistent storage 1205 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 1205 may also be removable. For example, a removable hard drive may be used for persistent storage 1205. Other examples include optical and magnetic disks, thumb drives, and smart cards that are inserted into a drive for transfer onto another computer readable storage medium that is also part of persistent storage 1205. Software and data 1212 can be stored in persistent storage 1205 for access and/or execution by one or more of the respective processors 1201 via cache 1203.

Communications unit 1207, in these examples, provides for communications with other data processing systems or devices. In these examples, communications unit 1207 includes one or more network interface cards. Communications unit 1207 may provide communications through the use of either or both physical and wireless communications links. Program 150 may be downloaded to persistent storage 1205 through communications unit 1207.

I/O interface(s) 1206 allows for input and output of data with other devices that may be connected to server computer 120. For example, I/O interface(s) 1206 may provide a connection to external device(s) 1208, such as a keyboard, a keypad, a touch screen, and/or some other suitable input device. External devices 1208 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 1205 via I/O interface(s) 1206. I/O interface(s) 1206 also connect to a display 1209.

Display 1209 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    parsing, by one or more computer processors, a received natural language question into an abstract meaning representation (AMR) graph;
    enriching, by the one or more computer processors, the AMR graph into an extended AMR graph;
    transforming, by the one or more computer processors, the extended AMR graph into a query graph utilizing a path-based approach, wherein the query graph is a directed edge-labeled graph; and
    generating, by the one or more computer processors, one or more answers to the natural language question through one or more queries created utilizing the query graph.

2. The computer-implemented method of claim 1, wherein parsing the received natural language question into the AMR graph, comprises:
    aligning, by the one or more computer processors, the received natural language question to one or more AMR nodes encoding integrated text and AMR input to multiple modules, wherein the multiple modules are entity linking and relation linking.

3. The computer-implemented method of claim 1, wherein enriching the AMR graph into the extended AMR graph, comprises:
    training, by one or more computer processors, a Bidirectional Encoder Representations from Transformers (BERT)-based neural mention detection model for disambiguation; and
    linking, by the one or more computer processors, one or more entities to one or more AMR nodes based on AMR node-text alignment information utilizing the trained BERT-based neural mention detection model, wherein the linking is a bijective mapping from a set of AMR entity nodes and a of entities in an underlying knowledge graph.

4. The computer-implemented method of claim 1, wherein transforming the extended AMR graph into the query graph utilizing the path-based approach, wherein the query graph is the directed edge-labeled graph, comprises:
    generating, by the one or more computer processors, a ranked list of knowledge graph (KG) relationships by relationship linking the received natural language question and an AMR predicate; and
    selecting, by the one or more computer processors, a highest-ranked valid query graph, wherein the query graph is a KG subgraph with unbound variables.

5. The computer-implemented method of claim 1, wherein generating the one or more answers to the received natural language question through the one or more queries created utilizing the query graph, comprises:
    converting, by the one or more computer processors, the query graph into an intermediate representation, wherein the intermediate representation is existential first order logic (FOL) comprising non-logical symbols comprising of one or more binary relations and entities in a knowledge base.

6. The computer-implemented method of claim 1, further comprising:
    eliminating, by the one or more computer processors, the one or more queries based on inconsistencies with a type hierarchy in a knowledge base.

7. The computer-implemented method of claim 1, further comprising:
    responsive to a structural and granularity mismatch, collapsing, by the one or more computer processors, all nodes that represent one or more predicates into an edge and combine the edge with surrounding edge labels, wherein the structural and granularity mismatch occurs when multiple nodes and edges in the AMR graph represent a single relationship in the query graph.

8. A computer program product comprising:
one or more computer readable storage media and program instructions stored on the one or more computer readable storage media, the stored program instructions comprising:
program instructions to parse a received natural language question into an abstract meaning representation (AMR) graph;
program instructions to enrich the AMR graph into an extended AMR graph;
program instructions to transform the extended AMR graph into a query graph utilizing a path-based approach, wherein the query graph is a directed edge-labeled graph; and
program instructions to generate one or more answers to the received natural language question through one or more queries created utilizing the query graph.

9. The computer program product of claim 8, wherein the program instructions to parse the received natural language question into the AMR graph, comprise:
program instructions to align the received natural language question to one or more AMR nodes encoding integrated text and AMR input to multiple modules, wherein the multiple modules are entity linking and relation linking.

10. The computer program product of claim 8, wherein the program instruction to enrich the AMR graph into the extended AMR graph, comprise:
program instructions to train a Bidirectional Encoder Representations from Transformers (BERT)-based neural mention detection model for disambiguation; and
program instructions to link one or more entities to one or more AMR nodes based on AMR node-text alignment information utilizing the trained BERT-based neural mention detection model, wherein the linking is a bijective mapping from a set of AMR entity nodes and a of entities in an underlying knowledge graph.

11. The computer program product of claim 8, wherein the program instructions to transform the extended AMR graph into the query graph utilizing the path-based approach, comprise:
program instructions to generate a ranked list of knowledge graph (KG) relationships by relationship linking the natural language question and an AMR predicate; and
program instructions to select a highest-ranked valid query graph, wherein the query graph is a KG subgraph with unbound variables.

12. The computer program product of claim 8, wherein the program instructions to generate the one or more answers to the received natural language question through the one or more queries created utilizing the query graph, comprise:
program instructions to convert the query graph into an intermediate representation, wherein the intermediate representation is existential first order logic (FOL) comprising non-logical symbols comprising of one or more binary relations and entities in a knowledge base.

13. The computer program product of claim 8, wherein the program instructions, stored on the one or more computer readable storage media, further comprise:
program instructions to eliminate the one or more queries based on inconsistencies with a type hierarchy in a knowledge base.

14. The computer program product of claim 8, wherein the program instructions, stored on the one or more computer readable storage media, further comprise:
program instructions to responsive to a structural and granularity mismatch, collapse all nodes that represent one or more predicates into an edge and combine the edge with surrounding edge labels, wherein the structural and granularity mismatch occurs when multiple nodes and edges in the AMR graph represent a single relationship in the query graph.

15. A computer system comprising:
one or more computer processors;
one or more computer readable storage media; and
program instructions stored on the one or more computer readable storage media for execution by at least one of the one or more computer processors, the stored program instructions comprising:
program instructions to parse a received natural language question into an abstract meaning representation (AMR) graph;
program instructions to enrich the AMR graph into an extended AMR graph;
program instructions to transform the extended AMR graph into a query graph utilizing a path-based approach, wherein the query graph is a directed edge-labeled graph; and
program instructions to generate one or more answers to the received natural language question through one or more queries created utilizing the query graph.

16. The computer system of claim 15, wherein the program instructions to parse the received natural language question into the AMR graph, comprise:
program instructions to align the received natural language question to one or more AMR nodes encoding integrated text and AMR input to multiple modules, wherein the multiple modules are entity linking and relation linking.

17. The computer system of claim 15, wherein the program instruction to enrich the AMR graph into the extended AMR graph, comprise:
program instructions to train a Bidirectional Encoder Representations from Transformers (BERT)-based neural mention detection model for disambiguation; and
program instructions to link one or more entities to one or more AMR nodes based on AMR node-text alignment information utilizing the trained BERT-based neural mention detection model, wherein the linking is a bijective mapping from a set of AMR entity nodes and a of entities in an underlying knowledge graph.

18. The computer system of claim 15, wherein the program instructions to transform the extended AMR graph into the query graph utilizing the path-based approach, comprise:
program instructions to generate a ranked list of knowledge graph (KG) relationships by relationship linking the received natural language question and an AMR predicate; and
program instructions to select a highest-ranked valid query graph, wherein the query graph is a KG subgraph with unbound variables.

19. The computer system of claim 15, wherein the program instructions to generate the one or more answers to the received natural language question through the one or more queries created utilizing the query graph, comprise:
    program instructions to convert the query graph into an intermediate representation, wherein the intermediate representation is existential first order logic (FOL) comprising non-logical symbols comprising of one or more binary relations and entities in a knowledge base.

20. The computer system of claim 15, wherein the program instructions, stored on the one or more computer readable storage media, further comprise:
    program instructions to eliminate one or more queries based on inconsistencies with a type hierarchy in a knowledge base.

* * * * *